United States Patent [19]
Knorr

[11] Patent Number: 5,971,377
[45] Date of Patent: *Oct. 26, 1999

[54] PLATE SPRINGS

[76] Inventor: Karl Knorr, 71069 Sindelfingen, Brandstrasse 14, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/581,909

[22] Filed: Jan. 2, 1996

[30] Foreign Application Priority Data

Nov. 22, 1995 [DE] Germany .................. P 44 47 330

[51] Int. Cl.⁶ ........................................ F16F 1/32
[52] U.S. Cl. ............................................ 267/161
[58] Field of Search .................... 267/158, 161, 267/162

[56] References Cited

U.S. PATENT DOCUMENTS

| | | | |
|---|---|---|---|
| 2,788,511 | 4/1957 | Marshall | 261/161 |
| 3,107,905 | 10/1963 | Lucas | 267/161 |
| 3,114,388 | 12/1963 | Hoen | 267/161 |
| 3,259,383 | 7/1966 | Johnson et al. | 267/161 |
| 4,400,861 | 8/1983 | Parker | 267/161 |

*Primary Examiner*—Matthew C. Graham

[57] ABSTRACT

The invention relates to a plate spring for dynamic use, the surface of which plate spring has undergone additional treatment, the surface being an electropolished surface which, after electropolishing, was subjected to compression blasting.

17 Claims, 1 Drawing Sheet

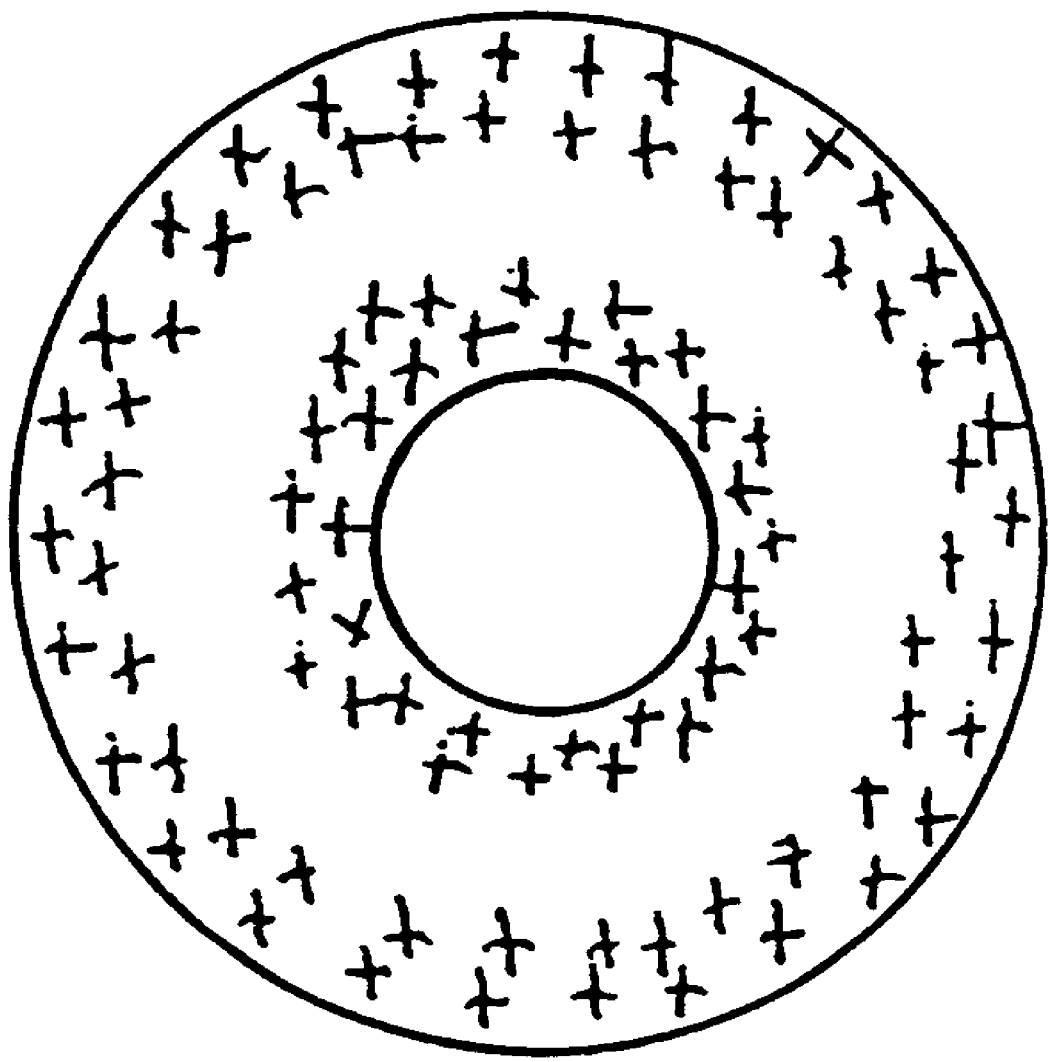

PLATE SPRINGS

BACKGROUND OF THE INVENTION

1. Field of the Invention

This invention relates to plate springs and a method for processing them.

2. Discussion of the Prior Art

It is known to produce plate springs in such a way that they have long expected service lives, even under dynamic loading. For example, in tests conducted by the inventor plate springs were subjected to a multiplicity of load cycles on eccentric and toggle presses under dynamic load conditions. The results of these tests were that plate springs of the prior art tested with an eccentric press using a stroke of 1.8 mm broke at 90,400 and 110,000 load cycles. In tests using a toggle press with a stroke of 1.8 mm, the plate springs broke at 480,000 and 487,000 load cycles. When the plate springs of the prior art were tested using a toggle press with a stroke of 2.8 mm, the plate springs broke at 38,000 and 95,000 load cycles.

SUMMARY OF THE INVENTION

The object of the invention is to provide plate springs having substantially increased service lives under dynamic load conditions. This object is achieved by plate springs that have an electropolished surface that were subjected to compression blasting after electropolishing.

A method according to the invention for processing such plate springs comprises: placing the plate springs in rows that hang freely on a frame for electropolishing; using an electrolyte that is suitable for electrochemical polishing of metal materials; treating the plate springs by electrochemical treatment for 10 to 40 minutes, at a temperature of 40 degrees C. to 60 degrees C. and at a voltage of about 24 volts. Following the electrochemical treatment, the plate springs are rinsed, dried and oiled. This is followed by compacting blasting in accordance with German standard DIN 8200 0N6.1.1.0.3.3 and/or compacting blasting in accordance with German standard DIN 8200 0N 6.1.1.0.3.4. The intensity of the blasting in accordance with Almen was 14–22 A2.

Casting grains GS-R 0.3–0.6 with a hardness of 50–58 HRC and/or rounded steel wire grain StD G3 0.3–0.6 with a hardness of 640 HV may be used as the blasting means.

Advantageously, the plate springs according to the invention may be made of spring steel in accordance with German standard DIN 17 222, or corrosion resistant steel in accordance with German standard DIN 17 224, or heat resistant steel in accordance with German standard DIN 17 240. The plate springs are electropolished within a time duration of 20 minutes plus 20 minutes minus 10 minutes.

The compression blasting is a compacting blasting. The blasting means may be casting grain. Round grain was used as the blasting means for the compacting blasting. If sharp-cornered grain were to be used, such as polygonal wire grain, no improvement in the service life of the plate springs would result. During compacting blasting, the plate springs were placed individually on a turntable and were blasted individually on the front and the back. The grain size may be GS-R 0.3–0.6. The blasting means type may be StG-G3. Or, the grain size of the blasting means may be StG-G3 0.3–0.6 HV 640—VDFE.

Concerning the method for processing plate springs according to the invention, the electrolyte may be of the type Poligrat E242. The duration of the treatment may be 20 minutes±10 minutes. The temperature may be 50 degrees C.+5 degrees C. The rinsing liquid may be water. The current density may be 0.002 A±50% per mm$^2$ of blasting surface. The size of the blasting means may be 0.3–0.6. The hardness of the blasting means may be 52–56 HRC. Finally, the plate springs may be subsequently phosphatized.

BRIEF DESCRIPTION OF THE DRAWING

A preferred embodiment of the invention will now be described with reference to the drawing, which shows a diagrammatic plan view of a plate spring.

DETAILED DESCRIPTION OF A PREFERRED EMBODIMENT

Table I shows the results of dynamic load tests using plate springs according to the prior art. For example, in tests conducted by the inventor, plate springs were subjected to a multiplicity of load cycles on eccentric and toggle presses. During these tests, the plate springs were loaded and relieved. Standard spring plates of the type 125 mm×71 mm×6 and lo=9.30 mm were used. Consistent with standard test procedures in the case of eccentric presses, the stroke was 1.8 mm; and in the case of toggle presses, the stroke was 1.8 and 2.8 mm. The following test results were achieved:

Plate springs according to the prior art tested with an eccentric press with a stroke of 1.8 mm broke at 90,400 and 110,000 load cycles. Plate springs according to the prior art tested with a toggle press with a stroke of 1.8 mm broke at 480,000 and 487,000 load cycles. Plate springs according to the prior art tested with a toggle press with a stroke of 2.8 mm broke at 38,000; 82,500; and 95,000 load cycles.

It can be observed from the test results of prior art plate springs that the greater the stroke, the greater the stress. Additionally, it can be seen that toggle presses are less harsh on the plate springs tested because toggle presses have a slower speed than eccentric presses.

Table I also shows tests under dynamic load conditions of plate springs processed according to the invention. In tests of these plate springs, no breakage occurred when the plate springs were sequentially tested on eccentric and toggle presses. On the eccentric press, the plate springs were subjected to a stroke of 1.8 mm where they withstood 200,400 load cycles without breaking. The same plate springs were then placed on a toggle press with a stroke of 1.8 mm, where they withstood 967,000 load cycles without breaking. Finally, the same plate springs were placed on a toggle press with a stroke of 2.8 mm, where they withstood 215,500 load cycles without breaking. In all, the tested plate springs withstood a total of almost 1.4 million load cycles without breaking. This clearly constitutes a major improvement in the ability of plate springs to withstand dynamic loading.

In the tests, three layers of plate springs according to the invention were used: one plate spring lying facing downwards, a second plate spring lying facing upwards, and a third plate spring lying facing downwards. The dimensions of each plate spring were as follows: the outside diameter was 125 mm; the inside diameter was 71 mm; and the construction height was 9.30 mm.

In the diagrammatic plan view of a plate spring processed according to the invention, the plus signs indicate that compression stresses have built up on the outside circumference and the inside circumference due to compacting blasting. It should be noted that a compression stress builds up in the upper most surface of the plate spring in the regions of the outside circumference and the inside circumference. Preferably, the compression stress should build up on the plate springs over all of the surface. However, it is not so important if compression stress does not build up in the central region (in the region between the outside and inside circumferences of the plate springs).

I claim:

1. A spring plate which has a surface that has undergone electropolishing and after electropolishing compression blasting, such that it withstands at least 480 thousand load cycles on a 1.8 mm toggle press.

2. A spring plate which has a surface that has undergone electropolishing and after electropolishing compression blasting, such that it withstands at least 95 thousand load cycles on a 2.8 mm toggle press.

3. A spring plate which has a surface that has undergone electropolishing and after electropolishing compression blasting such that it withstands at least 110 thousand load cycles on a 1.8 mm eccentric press.

4. A plate spring according to claim 3, wherein said spring plate is made from a steel selected from the group consisting of spring steel according to German Standard DIN 17 222, corrosion resistant steel according to German Standard DIN 17 224, and heat resistant steel according to German Standard DIN 17 240.

5. A plate spring according to claim 3, wherein said electropolished surface was electropolished from between 10 to 40 minutes.

6. A plate spring according to claim 3, wherein said compression blasting was a compacting blasting.

7. A plate spring according to claim 5, wherein said electropolished surface was subjected to a compacting blasting with casting grain.

8. A plate spring according to claim 6, wherein said electropolished surface was subjected to a compacting blasting with a blasting means of type STG-G3.

9. A method for producing a plate spring according to claim 3, comprising:

a) placing a plurality of plate springs in rows hanging freely on an electropolishing frame, b) employing an electrolyte that is suitable for electrochemical polishing of metal materials, c) electropolishing said plate springs for a time period of 10 to 40 minutes at a temperature of about 40 to 60 degrees C., with a voltage of about 24 volts, d) rinsing, drying and oiling said plate springs, and e) compacting blasting said plate springs in accordance with at least one of German Standard DIN 8200 0N6.1.1.0.3.3, and German Standard DIN 8200 0N6.1.1.0.3.4, wherein said compacting blasting has an intensity in accordance with Almen of 14–22 A2, and wherein said compacting blasting employs as blasting means at least one of (1) casting grain GS-R 0.3–0.6 with a hardness of 50 to 58 HRC and (2) rounded steel wire grain StD G3 0.3–0.6 with a hardness of 640 HV.

10. The method according to claim 9, wherein said electrolyte is of a type Poligrat E242.

11. The method according to claim 9, wherein said duration of treatment is 20 minutes±10 minutes.

12. The method according to claim 9, wherein said temperature is 50 degrees C.±5 degrees C.

13. The method according to claim 9, wherein water is employed as a rinsing liquid.

14. The method according to claim 9, further comprising employing a current density of 0.002 A±50% per $mm^2$ of spring surface.

15. The method according to claim 9, wherein said blasting means has a size of 0.3–0.6.

16. The method according to claim 9, wherein said blasting means has a hardness of 52–56 HRC.

17. The method according to claim 9, further comprising phosphatizing said plate springs after compacting blasting.

* * * * *